US011641449B1

(12) United States Patent
Bhagwan

(10) Patent No.: US 11,641,449 B1
(45) Date of Patent: May 2, 2023

(54) METHOD AND SYSTEM FOR VIDEO TELECONFERENCING MANAGEMENT

(71) Applicant: JPMorgan Chase Bank, N.A., New York, NY (US)

(72) Inventor: Varun Bhagwan, Los Gatos, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/456,615

(22) Filed: Nov. 26, 2021

(51) Int. Cl.
*H04N 7/15* (2006.01)
*H04L 65/1089* (2022.01)
*H04L 65/1069* (2022.01)
*H04L 43/0811* (2022.01)

(52) U.S. Cl.
CPC ........... *H04N 7/15* (2013.01); *H04L 43/0811* (2013.01); *H04L 65/1069* (2013.01); *H04L 65/1089* (2013.01)

(58) Field of Classification Search
CPC ... H04N 7/15; H04L 43/0811; H04L 65/1069; H04L 65/1089
USPC .......................................... 348/14.01–14.16
See application file for complete search history.

(56) References Cited

U.S. PATENT DOCUMENTS

| | | | |
|---|---|---|---|
| 7,920,158 B1 | 4/2011 | Beck et al. | |
| 9,258,195 B1* | 2/2016 | Pendleton | H04L 67/75 |
| 2013/0321562 A1* | 12/2013 | Takahashi | H04L 65/1096 |
| | | | 348/14.06 |
| 2018/0315330 A1* | 11/2018 | Mitros | H04L 43/0811 |
| 2021/0210097 A1* | 7/2021 | Diamant | H04N 7/147 |
| 2022/0191115 A1* | 6/2022 | C S | G10L 15/1815 |

OTHER PUBLICATIONS

International Search Report and Written Opinion issued in International Patent Application No. PCT/US 21/60891, dated Feb. 4, 2022.

* cited by examiner

*Primary Examiner* — Melur Ramakrishnaiah
(74) *Attorney, Agent, or Firm* — Greenblum & Bernstein, P.L.C.

(57) ABSTRACT

A method for providing participant status to facilitate video teleconferencing management is disclosed. The method includes receiving a starting indication that a video teleconference has been initiated, the video teleconference including a plurality of participants; generating a video histogram for each of the plurality of participants, the video histogram corresponding to an image that is captured for each of the plurality of participants; capturing an audio signature for each of the plurality of participants; determining, in real-time, a status for each of the plurality of participants based on the corresponding video histogram and the corresponding audio signature, the status relating to a connectivity status for the video teleconference; generating an indicator for each of the plurality of participants based on the corresponding status; and displaying, via a graphical user interface, the indicator for the plurality of participants, the graphical user interface corresponding to the initiated video teleconference.

20 Claims, 4 Drawing Sheets

METHOD AND SYSTEM FOR VIDEO TELECONFERENCING MANAGEMENT

BACKGROUND

1. Field of the Disclosure

This technology generally relates to methods and systems for teleconference management, and more particularly to methods and systems for providing participant status by using video histograms and audio signatures to facilitate video teleconferencing management.

2. Background Information

Many business entities utilize video teleconferencing services to facilitate interactive communication between employees. Often, the video teleconferencing services enable collaborative interactions by combining video and audio communications. Historically, implementation of conventional video teleconferencing services has resulted in varying degrees of success with respect to management of the video teleconference.

One drawback of using conventional video teleconferencing services is that in many instances, an audio and video status of a participant is not readily available for other participants. As a result, when the participant suffers from network and system instabilities that causes frozen video and/or broken audio, the other participants are unaware of the issues and may continue a discussion without interaction from the participant. Additionally, without the audio and video status, the participant sitting very still may cause a mistaken belief in the other participants that the video teleconference is frozen, which results in an interruption of the discussion.

Therefore, there is a need to provide participant status in video teleconferences by using video histograms and audio signatures to facilitate effective and collaborative interactions between employees.

SUMMARY

The present disclosure, through one or more of its various aspects, embodiments, and/or specific features or sub-components, provides, inter alia, various systems, servers, devices, methods, media, programs, and platforms for providing participant status by using video histograms and audio signatures to facilitate video teleconferencing management.

According to an aspect of the present disclosure, a method for providing participant status to facilitate video teleconferencing management is disclosed. The method is implemented by at least one processor. The method may include receiving a starting indication that a video teleconference has been initiated, the video teleconference may include a plurality of participants; generating at least one video histogram for each of the plurality of participants, the at least one video histogram may correspond to an image that is captured for each of the plurality of participants; capturing at least one audio signature for each of the plurality of participants; determining, in real-time, a status for each of the plurality of participants based on the corresponding at least one video histogram and the corresponding at least one audio signature, the status may relate to a connectivity status for the video teleconference; generating an indicator for each of the plurality of participants based on the corresponding status; and displaying, via a graphical user interface, the indicator for the plurality of participants, the graphical user interface may correspond to the initiated video teleconference.

In accordance with an exemplary embodiment, the at least one video histogram may relate to a representation of distributed numerical data that is extracted from the image, the image may correspond to a visual depiction that is captured for each of the plurality of participants from the video teleconference based on a predetermined parameter.

In accordance with an exemplary embodiment, the at least one video histogram for each of the plurality of participants may be generated based on a predetermined time interval; and wherein the at least one audio signature may be captured for each of the plurality of participants based on the predetermined time interval.

In accordance with an exemplary embodiment, each of the at least one video histogram may include an injected random data sequence that is usable for differentiation.

In accordance with an exemplary embodiment, the status may include at least one from among a video status and an audio status; and wherein the indicator may include at least one from among a graphical indicator and an audible indicator.

In accordance with an exemplary embodiment, to determine the status for each of the plurality of participants, the method may further include comparing the at least one video histogram and the at least one audio signature with at least one expected video histogram and at least one expected audio signature; identifying at least one delay based on a result of the comparing; and determining the status based on the identified delay and a predetermined delay threshold.

In accordance with an exemplary embodiment, the method may further include compiling historical data for the plurality of participants, the historical data may relate to a previously identified connectivity issue of a past video teleconference; automatically determining, by using at least one model, at least one corrective action based on the historical data, the at least one corrective action may relate to a mitigation of the identified at least one delay; and automatically initiating the at least one corrective action.

In accordance with an exemplary embodiment, the at least one corrective action may include at least one from among a first action that terminates a video connection to preserve bandwidth and a second action that temporarily pauses an audio connection when speech is not detected.

In accordance with an exemplary embodiment, the method may further include transmitting the at least one video histogram and the at least one audio signature from each of the plurality of participants to the plurality of participants; and locally determining, in real-time via a user device that corresponds to each of the plurality of participants, the status.

According to an aspect of the present disclosure, a computing device configured to implement an execution of a method for providing participant status to facilitate video teleconferencing management is disclosed. The computing device including a processor; a memory; and a communication interface coupled to each of the processor and the memory, wherein the processor may be configured to receive a starting indication that a video teleconference has been initiated, the video teleconference may include a plurality of participants; generate at least one video histogram for each of the plurality of participants, the at least one video histogram may correspond to an image that is captured for each of the plurality of participants; capture at least one audio signature for each of the plurality of participants; determine, in real-time, a status for each of the plurality of participants based on the corresponding at least one video histogram and the corresponding at least one audio signature, the status may relate to a connectivity status for the video teleconference; generate an indicator for each of the plurality of participants based on the corresponding status; and display, via a graphical user interface, the indicator for the plurality of participants, the graphical user interface may correspond to the initiated video teleconference.

In accordance with an exemplary embodiment, the at least one video histogram may relate to a representation of distributed numerical data that is extracted from the image, the image may correspond to a visual depiction that is captured for each of the plurality of participants from the video teleconference based on a predetermined parameter.

In accordance with an exemplary embodiment, the processor may be further configured to generate the at least one video histogram for each of the plurality of participants based on a predetermined time interval; and the processor may be further configured to capture the at least one audio signature for each of the plurality of participants based on the predetermined time interval.

In accordance with an exemplary embodiment, each of the at least one video histogram may include an injected random data sequence that is usable for differentiation.

In accordance with an exemplary embodiment, the status may include at least one from among a video status and an audio status; and the indicator may include at least one from among a graphical indicator and an audible indicator.

In accordance with an exemplary embodiment, to determine the status for each of the plurality of participants, the processor may be further configured to compare the at least one video histogram and the at least one audio signature with at least one expected video histogram and at least one expected audio signature; identify at least one delay based on a result of the comparing; and determine the status based on the identified delay and a predetermined delay threshold.

In accordance with an exemplary embodiment, the processor may be further configured to compile historical data for the plurality of participants, the historical data may relate to a previously identified connectivity issue of a past video teleconference; automatically determine, by using at least one model, at least one corrective action based on the historical data, the at least one corrective action may relate to a mitigation of the identified at least one delay; and automatically initiate the at least one corrective action.

In accordance with an exemplary embodiment, the at least one corrective action may include at least one from among a first action that terminates a video connection to preserve bandwidth and a second action that temporarily pauses an audio connection when speech is not detected.

In accordance with an exemplary embodiment, the processor may be further configured to transmit the at least one video histogram and the at least one audio signature from each of the plurality of participants to the plurality of participants; and locally determine, in real-time via a user device that corresponds to each of the plurality of participants, the status.

According to an aspect of the present disclosure, a non-transitory computer readable storage medium storing instructions for providing participant status to facilitate video teleconferencing management is disclosed. The storage medium including executable code which, when executed by a processor, may cause the processor to receive a starting indication that a video teleconference has been initiated, the video teleconference may include a plurality of participants; generate at least one video histogram for each of the plurality of participants, the at least one video histogram may correspond to an image that is captured for each of the plurality of participants; capture at least one audio signature for each of the plurality of participants; determine, in real-time, a status for each of the plurality of participants based on the corresponding at least one video histogram and the corresponding at least one audio signature, the status may relate to a connectivity status for the video teleconference; generate an indicator for each of the plurality of participants based on the corresponding status; and display, via a graphical user interface, the indicator for the plurality of participants, the graphical user interface may correspond to the initiated video teleconference.

In accordance with an exemplary embodiment, the at least one video histogram may relate to a representation of distributed numerical data that is extracted from the image, the image may correspond to a visual depiction that is captured for each of the plurality of participants from the video teleconference based on a predetermined parameter.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
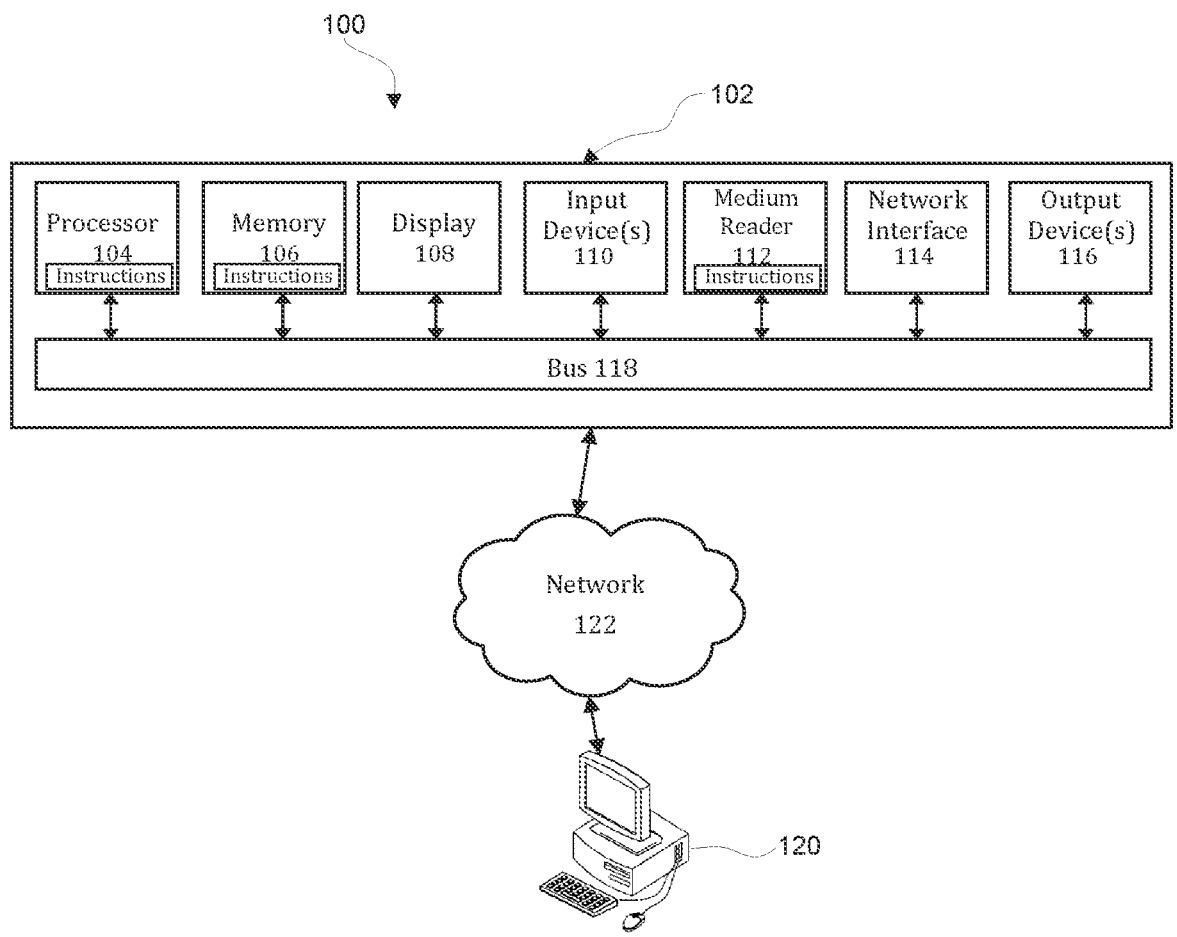
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing participant status by using video histograms and audio signatures to facilitate video teleconferencing management.

Figure 2:
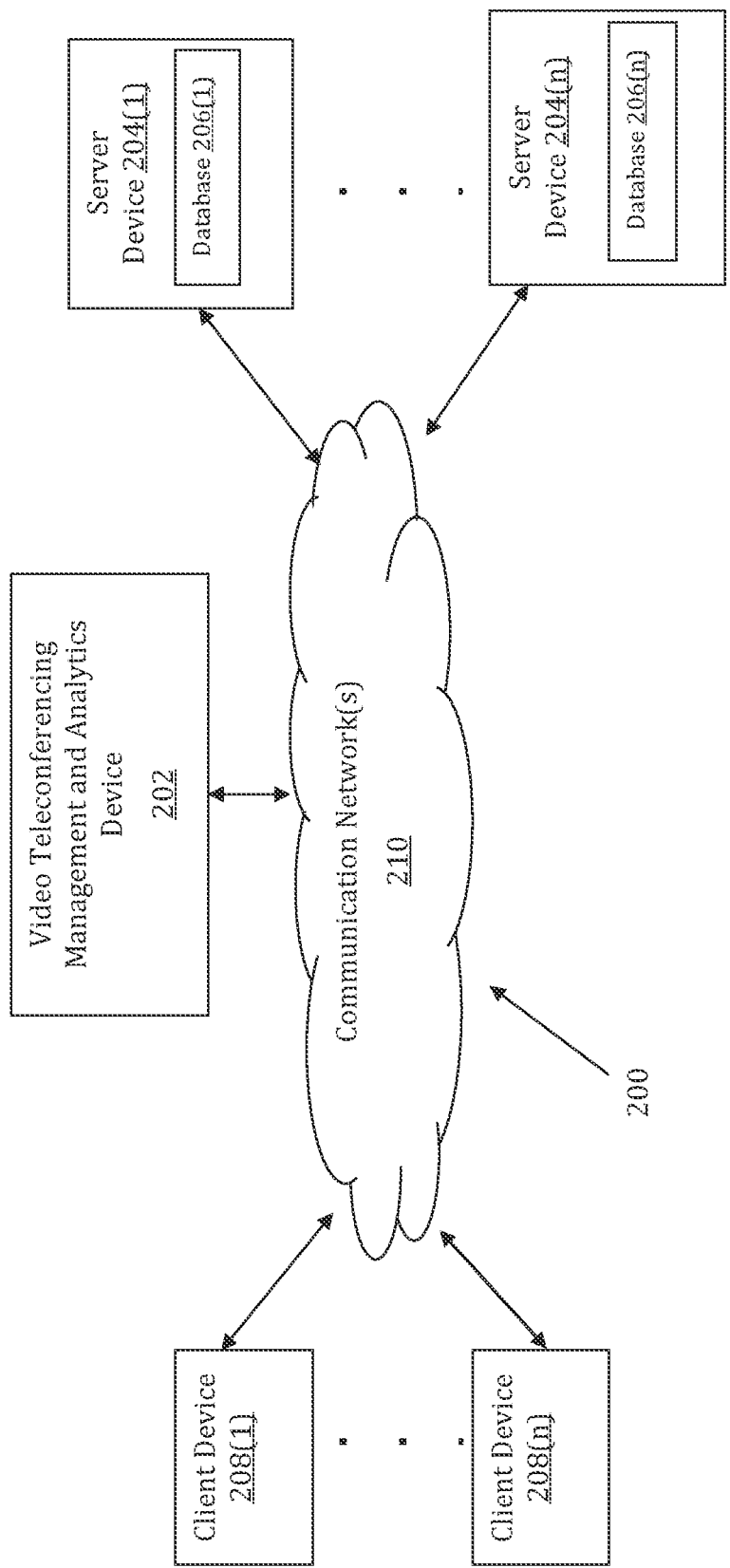
FIG. 2 illustrates an exemplary diagram of a network environment.

Referring to FIG. 2, a schematic of an exemplary network environment 200 for implementing a method for providing participant status by using video histograms and audio signatures to facilitate video teleconferencing management is illustrated. In an exemplary embodiment, the method is executable on any networked computer platform, such as, for example, a personal computer (PC).

The method for providing participant status by using video histograms and audio signatures to facilitate video teleconferencing management may be implemented by a Video Teleconferencing Management and Analytics (VTMA) device 202. The VTMA device 202 may be the same or similar to the computer system 102 as described with respect to FIG. 1. The VTMA device 202 may store one or more applications that can include executable instructions that, when executed by the VTMA device 202, cause the VTMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the VTMA device 202 itself, may be located in virtual server(s) running in a cloud-based computing environment rather than being tied to one or more specific physical network computing devices. Also, the application(s) may be running in one or more virtual machines (VMs) executing on the VTMA device 202. Additionally, in one or more embodiments of this technology, virtual machine(s) running on the VTMA device 202 may be managed or supervised by a hypervisor.

In the network environment 200 of FIG. 2, the VTMA device 202 is coupled to a plurality of server devices 204(1)-204(n) that hosts a plurality of databases 206(1)-206(n), and also to a plurality of client devices 208(1)-208(n) via communication network(s) 210. A communication interface of the VTMA device 202, such as the network interface 114 of the computer system 102 of FIG. 1, operatively couples and communicates between the VTMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the VTMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and VTMA devices that efficiently implement a method for providing participant status by using video histograms and audio signatures to facilitate video teleconferencing management.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The VTMA device 202 may be a standalone device or integrated with one or more other devices or apparatuses, such as one or more of the server devices 204(1)-204(n), for example. In one particular example, the VTMA device 202 may include or be hosted by one of the server devices 204(1)-204(n), and other arrangements are also possible. Moreover, one or more of the devices of the VTMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the VTMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to video teleconference indicators, video histograms, audio signatures, connection statuses, connection indicators, and historical participant data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the VTMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the VTMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the VTMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the VTMA device 202, the server devices 204(1)-204(n), or the client devices 208(1)-208(n), for example, may be configured to operate as virtual instances on the same physical machine. In other words, one or more of the VTMA device 202, the server devices 204(1)-204(n), or the client devices 208(1)-208(n) may operate on the same physical device rather than as separate devices communicating through communication network(s) 210. Additionally, there may be more or fewer VTMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
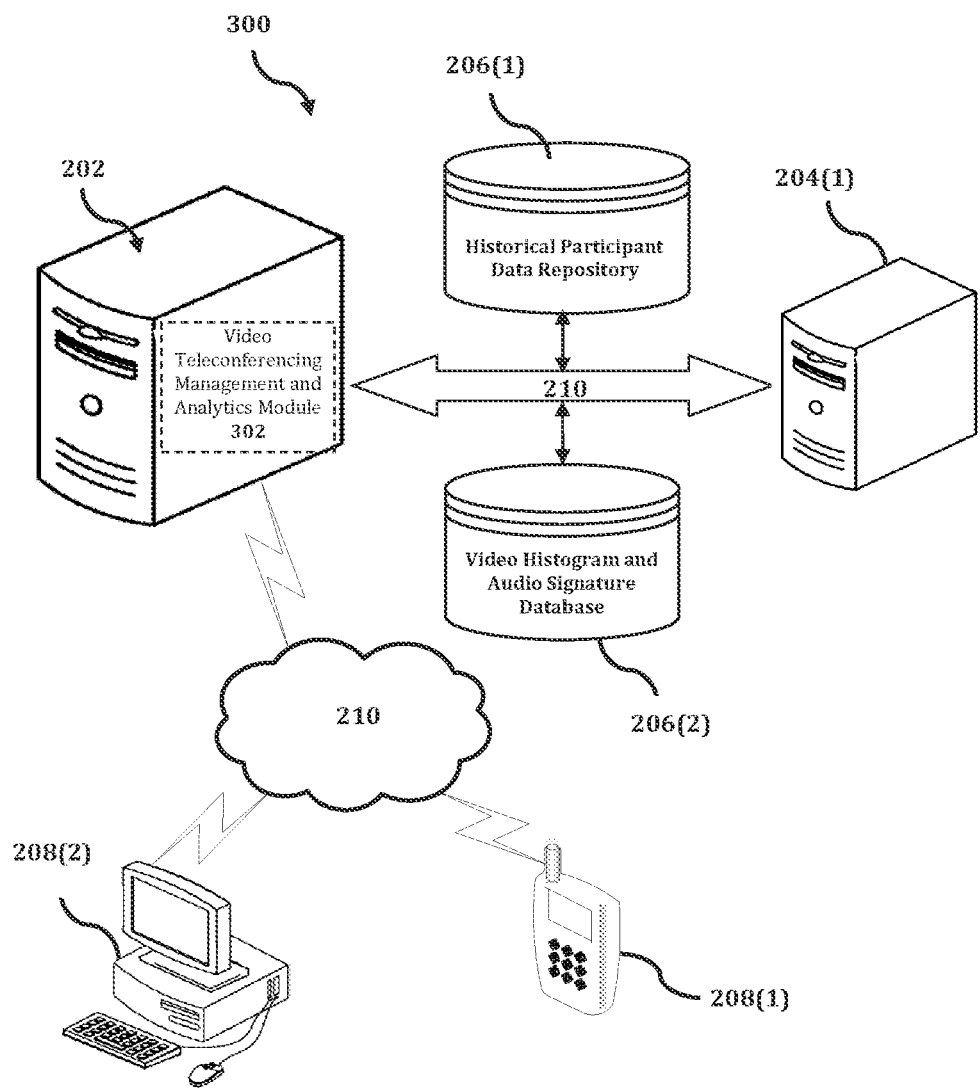
FIG. 3 shows an exemplary system for implementing a method for providing participant status by using video histograms and audio signatures to facilitate video teleconferencing management.

The VTMA device 202 is described and shown in FIG. 3 as including a video teleconferencing management and analytics module 302, although it may include other rules, policies, modules, databases, or applications, for example. As will be described below, the video teleconferencing management and analytics module 302 is configured to implement a method for providing participant status by using video histograms and audio signatures to facilitate video teleconferencing management.

An exemplary process 300 for implementing a mechanism for providing participant status by using video histograms and audio signatures to facilitate video teleconferencing management by utilizing the network environment of FIG. 2 is shown as being executed in FIG. 3. Specifically, a first client device 208(1) and a second client device 208(2) are illustrated as being in communication with VTMA device 202. In this regard, the first client device 208(1) and the second client device 208(2) may be "clients" of the VTMA device 202 and are described herein as such. Nevertheless, it is to be known and understood that the first client device 208(1) and/or the second client device 208(2) need not necessarily be "clients" of the VTMA device 202, or any entity described in association therewith herein. Any additional or alternative relationship may exist between either or both of the first client device 208(1) and the second client device 208(2) and the VTMA device 202, or no relationship may exist.

Further, VTMA device 202 is illustrated as being able to access a historical participant data repository 206(1) and a video histogram and audio signature database 206(2). The video teleconferencing management and analytics module 302 may be configured to access these databases for implementing a method for providing participant status by using video histograms and audio signatures to facilitate video teleconferencing management.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the VTMA device 202 via broadband or cellular communication. Of course, these embodiments are merely exemplary and are not limiting or exhaustive.

Upon being started, the video teleconferencing management and analytics module 302 executes a process for providing participant status by using video histograms and audio signatures to facilitate video teleconferencing management. An exemplary process for providing participant status by using video histograms and audio signatures to facilitate video teleconferencing management is generally indicated at flowchart 400 in FIG. 4.

Figure 4:
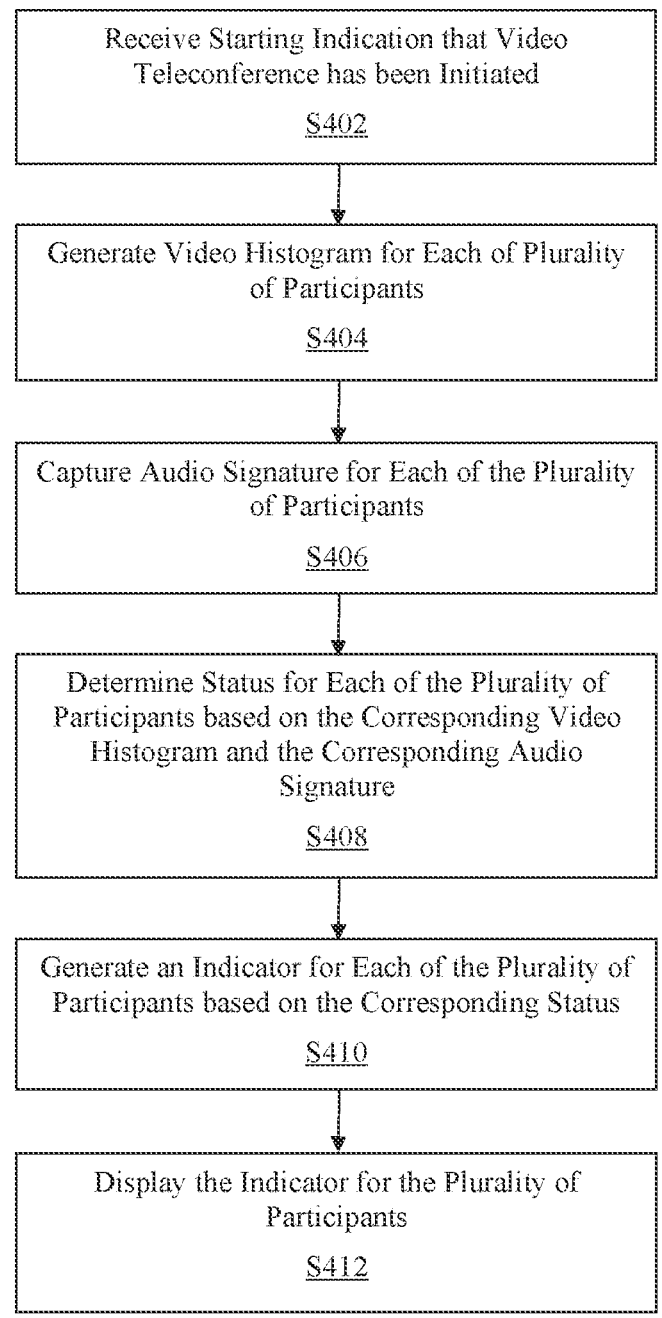
FIG. 4 is a flowchart of an exemplary process for implementing a method for providing participant status by using video histograms and audio signatures to facilitate video teleconferencing management.

In the process 400 of FIG. 4, at step S402, a starting indication that a video teleconference has been initiated may be received. The video teleconference may include a plurality of participants. In an exemplary embodiment, the indication may correspond to a signal that includes information relating to the initiation of the video teleconference. The information may include at least one from among video teleconference application information, participant information, as well as user device information. In another exemplary embodiment, the indication may be received directly from a video teleconference application. The indication may be received via a common communication protocol such as, for example, an application programming interface. In another exemplary embodiment, the indication may be captured from a data stream. For example, an event that is associated with a video teleconference may be captured from a data pipeline.

In another exemplary embodiment, the video teleconference may correspond to a technology such as, for example, videotelephony and videoconferencing that facilitates communication and interaction between two or more users. The video teleconference may utilize a combination of audio data as well as video data that are transmitted over a communication protocol such as, for example, an internet protocol (IP) to facilitate the communication. In another exemplary embodiment, the video teleconference may facilitate real-time communication between the two or more users.

At step S404, a video histogram may be generated for each of the plurality of participants. The video histogram may correspond to an image that is captured for each of the plurality of participants. In an exemplary embodiment, the video histogram may relate to a representation of distributed numerical data that is extracted from the image. The video histogram may correspond to an approximate representation of the distribution of numerical data. In another exemplary embodiment, the image may correspond to a visual depiction that is captured for each of the plurality of participants from the video teleconference based on a predetermined parameter. The image may relate to a general impression of each of the plurality of participants.

In another exemplary embodiment, the predetermined parameter may relate to a video teleconferencing setting. The video teleconferencing setting may dictate the type of image to capture such as, for example, a color image as well as how the image is captured. In another exemplary embodiment, the image may be captured directly by the video teleconference application as well as captured from a data stream of the video teleconference application. For example, the image may be captured from an event in a data pipeline that is associated with a video teleconference.

In another exemplary embodiment, the predetermined parameter may include an instruction to preprocess the image. The instruction may include guidelines for injecting a random data sequence such as, for example, noise into the image. In another exemplary embodiment, the random data sequence may be usable to differentiate each of the images. For example, the preprocessing may include an injection of noise into each image to differentiate the images. Consistent with disclosures in the present application, differentiation of the images may facilitate determining whether similar video histograms of a participant are due to the participant sitting very still or due to a frozen video stream.

In another exemplary embodiment, the video histogram for each of the plurality of participants may be generated based on a predetermined time interval. The predetermined time interval may relate to an expected time interval to generate the video histogram. For example, the predetermined time interval may indicate that one video histogram is generated for each of the plurality of users every second during the video teleconference. Based on the predetermined time interval, an expected rate of video histogram generation is also once every second.

At step S406, an audio signature for each of the plurality of participants may be captured. The audio signature may correspond to a condensed digital summary that is deterministically generated from an audio signal that is associated with each of the plurality of participants. In an exemplary embodiment, the audio signature may relate to a time-frequency graph such as, for example, a spectrogram of the audio signal. The time-frequency graph may include a graphical representation of characteristics such as, for example, frequency, amplitude, and time that corresponds with the audio signal.

In another exemplary embodiment, the audio signature may be captured for each of the plurality of participants based on the predetermined time interval. Consistent with disclosures in the present application, the predetermined time interval may relate to an expected time interval to capture the audio signature. For example, the predetermined time interval may indicate that one audio signature is captured for each of the plurality of users every second during the video teleconference. Based on the predetermined time interval, an expected rate of audio signature capture is also once every second.

At step S408, a status for each of the plurality of participants may be determined in real-time based on the corresponding video histogram and the corresponding audio signature. The status may relate to a connectivity status for the video teleconference. In an exemplary embodiment, the status may include at least one from among a video status and an audio status. The video status may indicate a quality of a video data stream that is associated with a participant. The audio status may indicate a quality of an audio data stream that is associated with the participant.

In another exemplary embodiment, determining the status for each of the plurality of participants may include comparing the video histogram and the audio signature with an expected video histogram and an expected audio signature. The actual rate of receipt for the video histogram and the audio signature may be compared to a corresponding expected rate of receipt. Consistent with disclosures in the present application, the expected rate of receipt for the video histogram and the audio signature may be determined based on the predetermined time interval. For example, the predetermined time interval may indicate that one audio signature and one video histogram are captured for each of the plurality of users every second during the video teleconference. Based on the predetermined time interval, an expected rate of receipt for the video histogram and audio signature is also once every second.

In another exemplary embodiment, a delay may be identified based on a result of the comparing. The delay may correspond to a difference between the actual rate of receipt and the expected rate of receipt. The delay may indicate a connectivity challenge for a participant. Then, the status for the participant may be determined based on the identified delay and a predetermined delay threshold. In another exemplary embodiment, the predetermined threshold may correspond to a magnitude that is associated with a level of delay. The level of delay may include at least one from among a low level of delay, a medium level of delay, and a high level of delay. For example, a delay of more than one second may be identified as a high level of delay, which indicates a more severe connectivity challenge.

At step S410, an indicator for each of the plurality of participants may be generated based on the corresponding status. The indicator may include at least one from among a graphical indicator and an audible indicator. In an exemplary embodiment, the graphical indicator may correspond to a graphical representation of the corresponding status. For example, for a status that corresponds to a severe connectivity challenge, the graphical indicator may include a red status light. In another exemplary embodiment, the audible indicator may correspond to an audible representation of the corresponding status. For example, for a status that corresponds to a severe connectivity challenge, the audible indicator may include a recognizable tune.

At step S412, the indicator may be displayed via a graphical user interface for the plurality of participants. The graphical user interface may correspond to the initiated video teleconference. In an exemplary embodiment, the indicator that corresponds with a participant may be displayed for the plurality of participants in the video teleconference. The indicator may be displayed next to an identifier such as, for example, a name of the corresponding participant to show the connectivity status of that participant. For example, a red indicator next to participant A may be displayed for other participants in the video teleconference to inform the other participants of participant A's connectivity challenges. In another exemplary embodiment, the indicator may be displayed for the corresponding participant. For example, a red indicator may be displayed for participant A to notify participant A of ongoing connectivity challenges.

In another exemplary embodiment, historical data for the plurality of participants may be compiled. The historical data may relate to a previously identified connectivity issue of a past video teleconference. A corrective action may be automatically determined by using a model based on the historical data. The corrective action may relate to a mitigation of the identified delay. In another exemplary embodiment, the corrective action may include at least one from among a first action that terminates a video connection of an affected participant to preserve bandwidth and a second action that temporarily pauses an audio connection of the affected participant to preserve bandwidth when speech is not detected. Then, the automatically determined corrective action may be automatically initiated to mitigate the connectivity challenges.

In another exemplary embodiment, the model may include at least one from among a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the video histogram and the audio signature from each of the plurality of participants may be transmitted to the plurality of participants. The video histogram and the audio signature from a participant may be transmitted to the other participants in the video teleconference. Then, the status for the participant may be locally determined in real-time via a user device of the other participants. For example, consistent with disclosures in the present application, the status for participant A may be determined locally on a user device of the other participants based on a detected transmission delay from participant A. The locally determined status may facilitate the local generation of a corresponding indicator for local display on the user device.

Accordingly, with this technology, an optimized process for providing participant status by using video histograms and audio signatures to facilitate video teleconferencing management is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing participant status to facilitate video teleconferencing management, the method being implemented by at least one processor, the method comprising:
   receiving, by the at least one processor, a starting indication that a video teleconference has been initiated, the video teleconference including a plurality of participants;
   generating, by the at least one processor, at least one video histogram for each of the plurality of participants by,
      capturing, by the at least one processor, an image for each of the plurality of participants;
      extracting, by the at least one processor, a representation of distributed numerical data from the captured image; and
      generating, by the at least one processor, the at least one video histogram based on the representation;
   capturing, by the at least one processor, at least one audio signature for each of the plurality of participants by,
      associating, by the at least one processor, an audio signal with each of the plurality of participants; and
      deterministically generating, by the at least one processor, the at least one audio signature for each of the plurality of participants from the corresponding audio signal;
   determining, by the at least one processor in real-time, a status for each of the plurality of participants based on the corresponding at least one video histogram and the corresponding at least one audio signature, the status relating to a connectivity status for the video teleconference;
   generating, by the at least one processor, an indicator for each of the plurality of participants based on the corresponding status, the indicator including a graphical indicator; and
   displaying, by the at least one processor via a graphical user interface, the indicator for the plurality of participants, the graphical user interface corresponding to the initiated video teleconference.

2. The method of claim 1, wherein the at least one video histogram relates to a representation of distributed numerical data that is extracted from the image, the image corresponding to a visual depiction that is captured for each of the plurality of participants from the video teleconference based on a predetermined parameter.

3. The method of claim 1, wherein the at least one video histogram for each of the plurality of participants is generated based on a predetermined time interval; and wherein the at least one audio signature is captured for each of the plurality of participants based on the predetermined time interval.

4. The method of claim 1, wherein each of the at least one video histogram includes an injected random data sequence that is usable for differentiation.

5. The method of claim 1, wherein the status includes at least one from among a video status and an audio status; and wherein the indicator includes at least one from among a graphical indicator and an audible indicator.

6. The method of claim 1, wherein determining the status for each of the plurality of participants further comprises:
   comparing, by the at least one processor, the at least one video histogram and the at least one audio signature with at least one expected video histogram and at least one expected audio signature;
   identifying, by the at least one processor, at least one delay based on a result of the comparing; and
   determining, by the at least one processor, the status based on the identified delay and a predetermined delay threshold.

7. The method of claim 6, further comprising:
   compiling, by the at least one processor, historical data for the plurality of participants, the historical data relating to a previously identified connectivity issue of a past video teleconference;
   automatically determining, by the at least one processor using at least one model, at least one corrective action based on the historical data, the at least one corrective action relating to a mitigation of the identified at least one delay; and
   automatically initiating, by the at least one processor, the at least one corrective action.

8. The method of claim 7, wherein the at least one corrective action includes at least one from among a first action that terminates a video connection to preserve bandwidth and a second action that temporarily pauses an audio connection when speech is not detected.

9. The method of claim 1, further comprising:
   transmitting, by the at least one processor, the at least one video histogram and the at least one audio signature from each of the plurality of participants to the plurality of participants; and
   locally determining, by the at least one processor in real-time via a user device that corresponds to each of the plurality of participants, the status.

10. A computing device configured to implement an execution of a method for providing participant status to facilitate video teleconferencing management, the computing device comprising:
   a processor;
   a memory; and
   a communication interface coupled to each of the processor and the memory, wherein the processor is configured to:
      receive a starting indication that a video teleconference has been initiated, the video teleconference including a plurality of participants;
      generate at least one video histogram for each of the plurality of participants by causing the processor to:
         capture an image for each of the plurality of participants;
         extract a representation of distributed numerical data from the captured image; and
         generate the at least one video histogram based on the representation;
      capture at least one audio signature for each of the plurality of participants by causing the processor to:
         associate an audio signal with each of the plurality of participants; and
         deterministically generate the at least one audio signature for each of the plurality of participants from the corresponding audio signal;
      determine, in real-time, a status for each of the plurality of participants based on the corresponding at least one video histogram and the corresponding at least one audio signature, the status relating to a connectivity status for the video teleconference;
      generate an indicator for each of the plurality of participants based on the corresponding status, the indicator including a graphical indicator; and display, via a graphical user interface, the indicator for the plurality of participants, the graphical user interface corresponding to the initiated video teleconference.

11. The computing device of claim 10, wherein the at least one video histogram relates to a representation of distributed numerical data that is extracted from the image, the image corresponding to a visual depiction that is captured for each of the plurality of participants from the video teleconference based on a predetermined parameter.

12. The computing device of claim 10, wherein the processor is further configured to generate the at least one video histogram for each of the plurality of participants based on a predetermined time interval; and wherein the processor is further configured to capture the at least one audio signature for each of the plurality of participants based on the predetermined time interval.

13. The computing device of claim 10, wherein each of the at least one video histogram includes an injected random data sequence that is usable for differentiation.

14. The computing device of claim 10, wherein the status includes at least one from among a video status and an audio status; and wherein the indicator includes at least one from among a graphical indicator and an audible indicator.

15. The computing device of claim 10, wherein, to determine the status for each of the plurality of participants, the processor is further configured to:
compare the at least one video histogram and the at least one audio signature with at least one expected video histogram and at least one expected audio signature;
identify at least one delay based on a result of the comparing; and
determine the status based on the identified delay and a predetermined delay threshold.

16. The computing device of claim 15, wherein the processor is further configured to:
compile historical data for the plurality of participants, the historical data relating to a previously identified connectivity issue of a past video teleconference;
automatically determine, by using at least one model, at least one corrective action based on the historical data, the at least one corrective action relating to a mitigation of the identified at least one delay; and
automatically initiate the at least one corrective action.

17. The computing device of claim 16, wherein the at least one corrective action includes at least one from among a first action that terminates a video connection to preserve bandwidth and a second action that temporarily pauses an audio connection when speech is not detected.

18. The computing device of claim 10, wherein the processor is further configured to:
transmit the at least one video histogram and the at least one audio signature from each of the plurality of participants to the plurality of participants; and
locally determine, in real-time via a user device that corresponds to each of the plurality of participants, the status.

19. A non-transitory computer readable storage medium storing instructions for providing participant status to facilitate video teleconferencing management, the storage medium comprising executable code which, when executed by a processor, causes the processor to:
receive a starting indication that a video teleconference has been initiated, the video teleconference including a plurality of participants;
generate at least one video histogram for each of the plurality of participants by causing the processor to:
capture an image for each of the plurality of participants;
extract a representation of distributed numerical data from the captured image; and
generate the at least one video histogram based on the representation;
capture at least one audio signature for each of the plurality of participants by causing the processor to:
associate an audio signal with each of the plurality of participants; and
deterministically generate the at least one audio signature for each of the plurality of participants from the corresponding audio signal;
determine, in real-time, a status for each of the plurality of participants based on the corresponding at least one video histogram and the corresponding at least one audio signature, the status relating to a connectivity status for the video teleconference;
generate an indicator for each of the plurality of participants based on the corresponding status, the indicator including a graphical indicator; and
display, via a graphical user interface, the indicator for the plurality of participants, the graphical user interface corresponding to the initiated video teleconference.

20. The storage medium of claim 19, wherein the at least one video histogram relates to a representation of distributed numerical data that is extracted from the image, the image corresponding to a visual depiction that is captured for each of the plurality of participants from the video teleconference based on a predetermined parameter.

* * * * *